United States Patent
Sridharan et al.

(10) Patent No.: US 9,135,097 B2
(45) Date of Patent: Sep. 15, 2015

(54) NODE DEATH DETECTION BY QUERYING

(75) Inventors: Vijay Sridharan, Santa Clara, CA (US); Huy Nguyen, Belmont, CA (US); Jia Shi, Burlingame, CA (US); Alex Tsukerman, Foster City, CA (US); Kothanda Umamageswaran, Sunnyvale, CA (US)

(73) Assignee: ORACLE INTERNATIONAL CORPORATION, Redwood Shore, CA (US)

( * ) Notice: Subject to any disclaimer, the term of this patent is extended or adjusted under 35 U.S.C. 154(b) by 467 days.

(21) Appl. No.: 13/431,196

(22) Filed: Mar. 27, 2012

(65) Prior Publication Data

US 2013/0262937 A1 Oct. 3, 2013

(51) Int. Cl.
*G06F 11/00* (2006.01)
*G06F 11/07* (2006.01)
*H04L 12/26* (2006.01)

(52) U.S. Cl.
CPC .......... *G06F 11/0709* (2013.01); *G06F 11/076* (2013.01); *H04L 43/0817* (2013.01); *H04L 43/10* (2013.01); *H04L 43/16* (2013.01)

(58) Field of Classification Search
CPC .............. G06F 3/0631–3/0635; G06F 3/0601; G06F 3/0629; G06F 3/0689; G06F 11/1076; G06F 2011/1054; G06F 2003/06
USPC ........ 714/3, 4.11, 4.2, 4.3; 709/203, 219, 223
See application file for complete search history.

(56) References Cited

U.S. PATENT DOCUMENTS

| 5,173,689 | A | 12/1992 | Kusano | |
|---|---|---|---|---|
| 6,269,099 | B1 * | 7/2001 | Borella et al. | 370/389 |
| 6,349,357 | B1 * | 2/2002 | Chong, Jr. | 711/111 |
| 6,363,495 | B1 * | 3/2002 | MacKenzie et al. | 714/4.5 |
| 6,370,605 | B1 * | 4/2002 | Chong, Jr. | 710/33 |
| 6,397,267 | B1 * | 5/2002 | Chong, Jr. | 710/1 |
| 6,694,361 | B1 * | 2/2004 | Shah et al. | 709/222 |
| 6,898,752 | B2 * | 5/2005 | Tucker | 714/752 |
| 7,543,170 | B2 | 6/2009 | Ross et al. | |
| 7,822,028 | B1 | 10/2010 | Rimmer | |

(Continued)

FOREIGN PATENT DOCUMENTS

| WO | 9722208 | 6/1997 |
|---|---|---|
| WO | 03013065 A1 | 2/2003 |

OTHER PUBLICATIONS

Oracle, "InfiniBand Network Troubleshooting Guidelines and Methodologies" Oct. 2012, Oracle, pp. 1-39.*

(Continued)

*Primary Examiner* — Bryce Bonzo
*Assistant Examiner* — Jeison C Arcos
(74) *Attorney, Agent, or Firm* — Kraguljac Law Group, LLC (57) ABSTRACT

Systems, methods, and other embodiments associated with detecting a node death in a clustered distributed system are described. In one embodiment, a method includes transmitting a ping message to a peer node in the network. If a reply to the ping message is not received from the peer node, a query is sent to table of port identifiers that lists ports in the cluster. In one embodiment, the query includes a port identifier associated with the peer node. The peer node is declared as inactive/dead when the query fails to locate a match in the table for the port identifier. When the query locates a match in the table for the port identifier, another ping message is periodically transmitted to the peer node.

21 Claims, 4 Drawing Sheets

(56) References Cited

U.S. PATENT DOCUMENTS

| | | | |
|---|---|---|---|
| 7,872,982 B2 | 1/2011 | Atkins et al. | |
| 8,019,941 B2 | 9/2011 | Mann et al. | |
| 2002/0087751 A1* | 7/2002 | Chong, Jr. | 710/33 |
| 2002/0169861 A1* | 11/2002 | Chang et al. | 709/223 |
| 2003/0021223 A1 | 1/2003 | Kashyap | |
| 2003/0033427 A1* | 2/2003 | Brahmaroutu | 709/238 |
| 2004/0008823 A1* | 1/2004 | Kindermann et al. | 379/1.01 |
| 2004/0085894 A1* | 5/2004 | Wang et al. | 370/216 |
| 2004/0103244 A1* | 5/2004 | Fujimoto et al. | 711/113 |
| 2005/0022045 A1 | 1/2005 | Fenart et al. | |
| 2005/0022047 A1* | 1/2005 | Chandrasekaran | 714/4 |
| 2005/0182864 A1* | 8/2005 | Hosoya et al. | 710/22 |
| 2006/0002292 A1* | 1/2006 | Chang et al. | 370/225 |
| 2006/0045098 A1* | 3/2006 | Krause | 370/396 |
| 2006/0062141 A1* | 3/2006 | Oran | 370/216 |
| 2006/0187937 A1* | 8/2006 | Townsley et al. | 370/395.53 |
| 2006/0203846 A1* | 9/2006 | Davis | 370/466 |
| 2007/0140159 A1* | 6/2007 | Eronen et al. | 370/328 |
| 2009/0070761 A1* | 3/2009 | Zhao | 718/1 |
| 2009/0158124 A1* | 6/2009 | Kawai et al. | 714/763 |
| 2009/0204743 A1* | 8/2009 | Inoue et al. | 711/100 |
| 2010/0097941 A1* | 4/2010 | Carlson et al. | 370/245 |
| 2010/0100630 A1* | 4/2010 | Jiang | 709/228 |
| 2011/0019535 A1 | 1/2011 | Nakashima et al. | |
| 2011/0219263 A1 | 9/2011 | Goel | |
| 2013/0064067 A1* | 3/2013 | Kamath et al. | 370/218 |

OTHER PUBLICATIONS

IBM "Mellanox InfiniBand Management and Monitoring Best Practices" Nov. 2103, IBM, pp. 1-17.*

Intel "Troubleshooting InfiniBand connection issues using OFED tools" Jan. 2010, Intel, p. 1-3.*

Cisco, "Fundamentals of the Cisco High-Performance Subnet Manager," Cisco High Performance Subnet Manager for InfiniBand Server Switches, Release 1.3, Chapter 1, pp. 1-1 thru 1-12, Nov. 2008; Cisco Systems, Inc., San Jose, CA.

IBM Corporation, "Failover Support for InfiniBand," http://publib.boulder.ibm.com/infocenter/wllm/v2r5/index.jsp?topic=%2Fcom.ibm.wllm.doc%2Fwllmover_infiniband_failover.html; 2006; p. 1 of 1, IBM Corporation.

Cisco Systems, Inc., "Cisco Catalyst Switch Manager User Guide, Release 3.2," Alarms and Alarm Management, 2004, pp. 13-1 and 13-43 thru 13-53; Cisco Systems, Inc., San Jose, CA.

Oracle, "Oracle Exalogic Machine Owner's Guide," EL X2-2, Part No. E18478-06, Feb. 2012, Chapter/pp. 14-1 to 14-13, Oracle, Redwood Shores, CA.

* cited by examiner

NODE DEATH DETECTION BY QUERYING

BACKGROUND

Distributed Computing Environments (DCE) include a group of machines (nodes) that interact in a network to solve a common problem. To ensure proper operation of the environment, each machine needs to know that the other peer machines are alive and active. As such, each machine employs health detection logic to determine whether a peer machine is alive or not.

Existing detection technologies involve some form of pinging, where every machine in the group sends a ping message (e.g., "Are you Alive") at periodic intervals (Ping Interval) to every other machine and expects an acknowledgement reply (e.g., which means "I am alive") if the machine is alive and operating. If the requesting machine does not receive a reply for some number of consecutive ping messages, the requesting machine declares the peer machine dead. Subsequently, the DCE reconfigures the network topology to exclude the dead machine and resumes work with the current group of active machines.

If a machine dies in an unplanned manner, for example, as a result of a power reset, force reboot or kernel panic, the DCE could end up freezing for some time period. This may occur when the dead machine holds locks that guard shared resources (e.g., storage device, database records, memories, and so on). Since the machine is now dead, the locks held by the dead machine cannot be acquired and thus the shared resources cannot be used until the situation is detected and resolved. This causes a brownout.

The delay in detecting the dead machine may occur as follows. For example, suppose pings are sent every 2 seconds and a machine is not declared as dead until 15 consecutive pings do not receive a reply (e.g., Ping Interval=2 and Miss Count=15). The brownout upon machine death would be anywhere from 30 to 32 seconds. The ping and miss count values cannot be set overly aggressive as it can result in false positives. It is possible that an active machine does not reply to a ping for various reasons (e.g., ping does not reach the machine, process that replies to ping messages has crashed and is being restarted, etc. . . . ). Thus failure to respond to one or two ping messages by itself is not an accurate determination that a machine is dead.

Being able to detect a machine's death as quickly and as reliably as possible may improve the availability of resources on a network.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments are described herein that provide techniques to detect the unplanned death of nodes/cells in a clustered computing network. With the disclosed techniques, end-to-end brownout time may be reduced for unplanned node or cell death/outage from 30+ seconds to less than 5 seconds in some configurations. In one embodiment as described herein, a node death is detected by a technique that includes querying a subnet manager in an InfiniBand network.

The following network configuration is described to provide an example environment in which the present node death detection techniques can operate. Of course, other types of configurations may be used.

Figure 1:
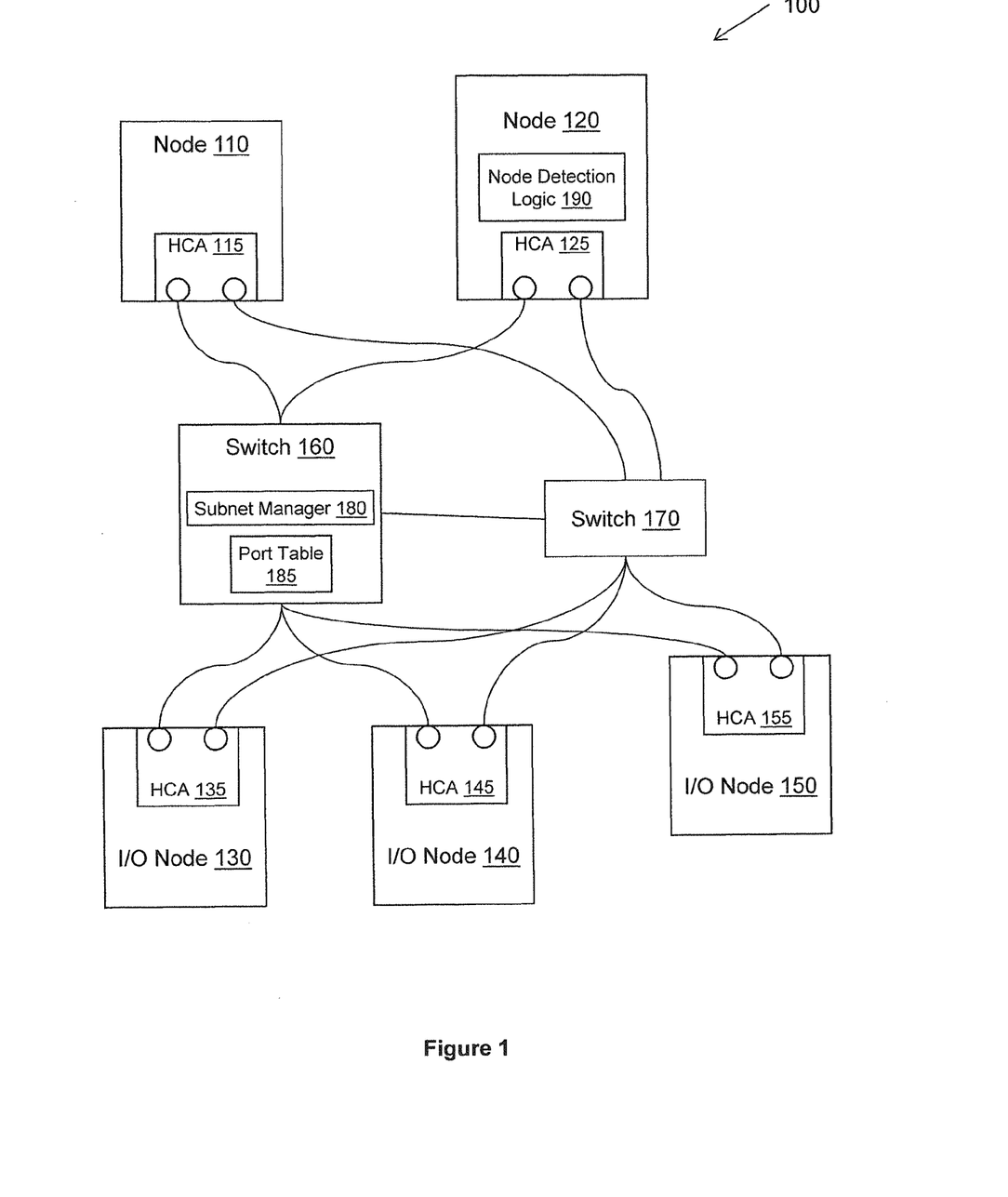
FIG. 1 illustrates one embodiment of node detection logic in a clustered system.

With reference to FIG. 1, one embodiment of a network 100 that is associated with node death detection is illustrated. The network 100 includes a number of nodes (e.g., nodes 110, 120, 130, 140, 150) and one or more switches (e.g., switch 160, switch 170). The nodes and switches are connected to each other in point-to-point, serial connections via cables connected to ports (illustrated as small circles) in network interfaces. In one embodiment, the network 100 is implemented as an InfiniBand fabric and the following examples will be described with such a configuration. However, the present embodiments may be implemented with other distributed networks built with other types of interconnect instead of InfiniBand.

The InfiniBand Architecture (IBA) specifications define InfiniBand operation. IBA is a clustering fabric and includes an entity that initializes, configures, and manages the fabric. IBA defines this entity as a "Subnet Manager" 180, which is tasked with the role of subnet administration. In one embodiment, the subnet manager 180 is implemented in switch 160 and performs its tasks in-band (i.e., over IB links) and discovers and initializes devices (e.g., switches, nodes, etc.) that are coupled to the IB fabric. When there are multiple switches in the network 100, one switch is elected as a master by its peers and is responsible for tracking Host Channel Adapter (HCA) ports and switch ports connected to the fabric. In one embodiment, the subnet manager 180 is implemented in switch 160 that is designated as a spine switch and other switches are designated as leaf switches (e.g., one spine switch and one or more leaf switches). If the spine switch were to fail, the subnet manager 160 may failover to one of the leaf switches.

Each node is connected to the fabric through a Host Channel Adapter (HCAs 115, 125, 135, 145, and 155), which is Infiniband's version of a network interface card. Another type of network interface is a Target Channel Adapter (TCA) but only the HCA will be described here for simplicity. In one embodiment, each HCA has one or more connection ports. For example, two ports are shown in each HCA as two small circles connected to a cable. As illustrated, in each HCA, one port is connected to switch 160 and the other port is connected to switch 170. This provides a failover in case one switch fails.

The subnet manager 180 assigns a unique Local Identifier (LID) to a port when connected to the network 100 to uniquely identify each port. Each port may also include a port serial number that is a Globally Unique Identifier (GUID)

assigned to the port, which is not assigned by the subnet manager 180 but is previously assigned, for example, by the manufacturer). The subnet manager 180 builds and maintains a table 185 that identifies the nodes and/or their port identifiers (along with their corresponding port serial number) for each node/port connected to the network 100. When a new port is connected to the switch 160, the new port is assigned a unique ID, which is registered in the port table 185. In one embodiment, the port table 185 includes a mapping for each port on the network that associates serial numbers of each port and the port's assigned unique identifier.

When a port is disconnected from the network 100, the port identifier is removed from the port table 185. For example, when a node dies (gracefully or unplanned), the node's ports are no longer visible to the master subnet manager 180 and this happens instantaneously (since communication is lost in the point-to-point connection). The overall functionality of the subnet manager 180 is beyond the scope of this disclosure and will not be discussed. In general, subnet manager 180 represents an entity and keeps track of the nodes/ports that are connected to the network 100.

In the illustrated embodiment, each node is also connected to a second switch 170 to provide a failover in case switch 160 malfunctions or stops operating. One or more switches can be used in the network 100 depending on the desired configuration. However, the number of switches, and/or nodes illustrated is not intended to be limiting.

Further consider that in one embodiment, the nodes 110 and 120 may be computing nodes (e.g., computers, servers, database nodes in a database system), and so on) and the nodes 130, 140, and 150 may be input/output (I/O) nodes (e.g., storage cells, storage devices, and so on) that are shared devices and accessed by multiple computing nodes. Of course, any configuration or type of nodes and devices can be implemented since the type of node configuration is not the focus of discussion.

With the example network 100 introduced and with continued reference to FIG. 1, the node death detection mechanism of the present systems and methods is now described. The mechanism is illustrated as node detection logic 190 implemented in node 120. The node detection logic 190 provides functionality to node 120 to determine whether other nodes on the network 100 are alive and operating or dead (e.g., node stopped functioning, is unreachable, or otherwise node has stopped responding to communications). In one embodiment, the node detection logic 190 is implemented in a heartbeat mechanism. Although one node detection logic 190 is shown in FIG. 1 for simplicity, each node in the network may be implemented with a similar logic in order to verify the state of other peer nodes. As mentioned in the background, nodes may hold locks on shared resources and if a node dies/fails, the quicker the system can detect the death, the quicker the group of nodes/servers can reconfigure itself and continue operating properly to provide high availability to users and applications.

In one embodiment, the node detection logic 190 operates as follows. Node detection logic 190 periodically sends ping messages to each of the nodes on the network 100 to check if the peer node is alive. This is referred to as a heartbeat mechanism or ping protocol. When a node receives a ping message, the node responds with an acknowledgement message which means the node is alive. If a node fails to reply to a predetermined number of consecutive pings, the node detection logic 190 deems it as a suspicious node whose state is uncertain.

To verify the suspicious node's state, a second mechanism is performed, namely, sending a query to the subnet manager 180 where the query requests a function that involves an identifier of the suspicious node (e.g., its port identifier). The assumption made by the node detection logic 190 is that if a request involving a port identifier (from a port that was known to be previously alive) cannot be successfully performed on the port table 185 (by the subnet manager 180 or other controlling entity that may be named differently), then the associated port is not in the port table 185. If the port is not in the port table 185, then its node is not visible and not communicating in the network 100. The node is then declared dead by the node detection logic 190.

The subnet manager 180, however, does not track whether a node is alive or dead and cannot make such a determination by itself. The subnet manager 180 only maintains a list of ports that are currently connected to the network 100. If a port becomes disconnected from the network 100 or fails to communicate for any reason, the port is removed from the port table 185 since the port is no longer visible to the subnet manager 180. The action of removing a port or node from the table 185 by itself is not determinative that the associated node is dead since the node may be intentionally disconnected from the network. If a node has multiple ports (as shown in FIG. 1), then the node will still be connected to the network via the second port until the second port is disconnected.

Furthermore, simply because a port does not appear in the port table 185 is not determinative that the associated node is dead since the node may have been previously intentionally removed or may have never been connected to the network in the first place (e.g., such as when the query request uses an incorrect port identifier). Thus the two processes performed by the node detection logic 190 (e.g., heartbeat process and query process) for testing two conditions provide a more reliable determination. The heartbeat process first determines that the node is alive in the network using pings and then if a ping fails, the query process verifies that the node is dead when the node is no longer visible in the network fabric (e.g., port does not appear in the port table 185). In this manner, a node's death can be determined more quickly and more reliably than simply using a ping protocol. Greater detail of the node detection logic is described with reference to FIG. 2.

Figure 2:
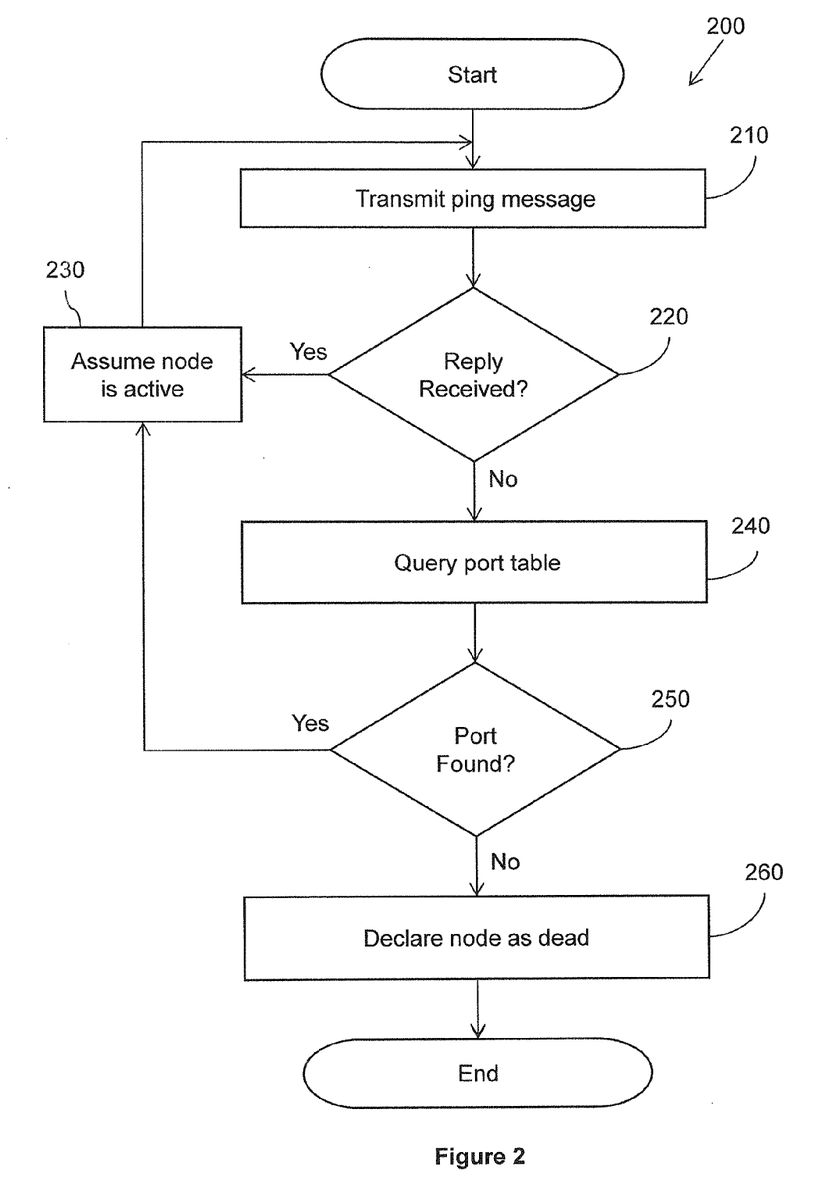
FIG. 2 illustrates one embodiment of a method associated with detecting a node death.

FIG. 2 illustrates one embodiment of a method 200 associated with detecting the death of a node. Method 200 will be described as one embodiment that can be performed by the node detection logic 190 (from FIG. 1) in a network with similar features as shown in FIG. 1. Furthermore, method 200 will be described from the perspective of one node performing the method but it will be appreciated that many or all nodes could be simultaneously performing the method. FIG. 2 describes a more general embodiment of the detection method whereas FIG. 3 describes a more detailed embodiment of the detection method.

With reference to FIG. 2, at 210, the method begins when a node transmits a ping message to peer node (pinged node) in the network. Ping messages are typically sent to every known node in the network but the present example with be discussed with reference to one node. In that regard, a ping interval may be set in which ping messages are periodically sent, for example, every two (2) seconds. Since communication latency between nodes is low in an InfiniBand network, the sending node expects to receive a reply (e.g., an acknowledgement packet) to the ping message very quickly. At 220, if a reply is received from the pinged node, then the method moves to 230 and the pinged node is alive and active. The method then returns and repeats sending ping messages periodically as a way to continuously monitor the node's status.

At 220, however, if a reply to the ping message is not received, the pinged node is labeled as suspicious and the method moves to 240. In some embodiments, a suspicion threshold can be set that defines a number of missed ping messages that triggers the method to pass to block 240 (e.g., 2-3 misses). Further examples will be described with reference to FIG. 3.

With continued reference to FIG. 2, at 240, the method performs a verification function in an attempt to verify that the suspicious node is dead or alive. The verification function includes querying a port table to determine if the port(s) of the suspicious node is present in the network. As explained with reference to FIG. 1, the port table 185 maintains a listing of port identifiers for all ports visible on the network (e.g., connected and communicating in the cluster). In one embodiment, the query is sent to the subnet manager 180 that maintains the port table 185 although in other networks the entity that maintains the port table may be named differently.

In one embodiment, each node in the network locally maintains network information such as identifiers associated with other nodes in the network. For example, a serial number of each port of each node is known by peer nodes. In one example, the port serial number can be procured when a pair of nodes initially establishes connectivity to each other and they send each other their port serial numbers. Thus when the state of a peer node becomes suspicious from a failed ping, its port serial number is retrieved from the maintained network information. The port serial number is used in the query to the subnet manager to perform a function such as translate the port serial number to its corresponding local identifier (LID). Recall that the local identifier LID is assigned to each port by the subnet manager. In this example, it is assumed that the nodes are not privy to the local identifiers assigned by the subnet manager (on the remote switch 160) and thus use port serial numbers in the query. In another embodiment, the requesting node may know the local identifier of each peer node and thus could directly request whether the local identifier is present in the port table. In this case, when the query fails to locate a match in the table for the port identifier, the node is declared dead.

Accordingly, the query includes some identifier associated with the suspicious node (e.g., its port serial number, address, or other identifier) and requests to translate the identifier. The subnet manager responds to the query by attempting to translate the port serial number to its assigned local identifier using the mappings in the port table. If the port serial number or the local identifier is not present in the port table, the translation fails and the subnet manager returns a failure notice or other type of port-not-found message. As previously mentioned, the requesting node operates on the assumption that if the query could not be processed, then it means the port was not found in the port table. Therefore, since the suspicious node was at one point alive (replied to at least one ping message), but now failed to reply to at least one ping and was not found in the port table, the node is declared as dead at 260. In another embodiment, if the suspicious node has multiple ports, a query may be sent for each of the other ports to confirm they are all not found in the port table before the suspicious node is declared dead.

If however at 250, the query translation is successful, a successful query result is returned to the requesting node. Thus the port identifier was found in the port table. As a result, the suspicious node is assumed still active and alive at 230. The suspicion threshold is reset and the ping process continues by periodically transmitting another ping message to the peer node (and other nodes if present on the network).

It is noted that the function performed by the subnet manager when processing the query is not related to determining whether a node is dead. In other words, the subnet manager is not configured to determine if or when a node dies. Thus the query to the subnet manager may be viewed as an indirect form of determination when a failed query request occurs in combination with a failed ping request.

Figure 3:
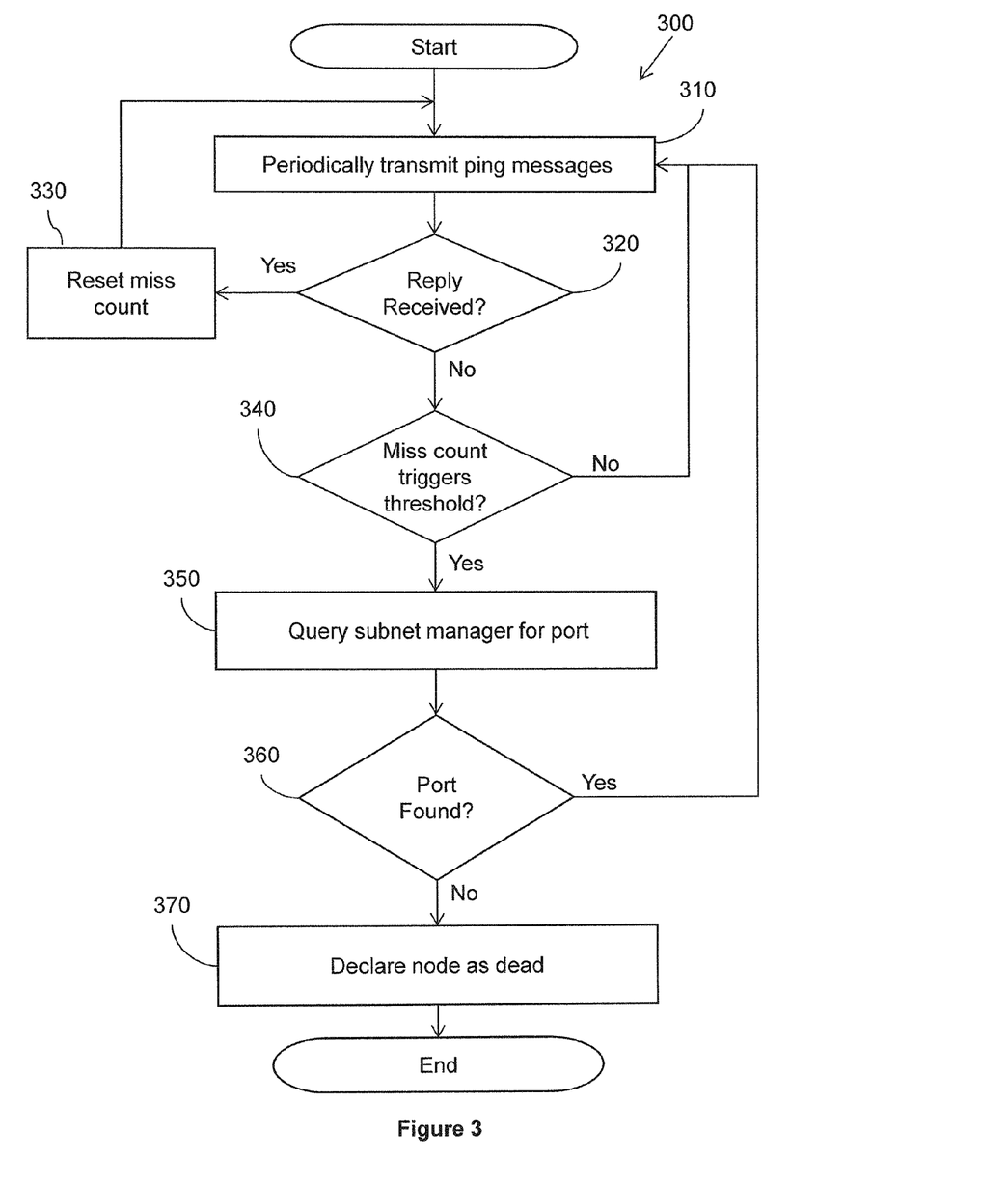
FIG. 3 illustrates another embodiment of a method associated with detecting a node death.

With reference to FIG. 3, another embodiment of a node death detection method is shown as method 300. Method 300 is similar to method 200 but incorporates miss counts and a suspicion threshold. For example, a node performing the detection process tracks a miss count for each peer node that receives pings. The miss count is tracked as a number a consecutive ping messages for which no reply is received. After some designated maximum number of missed pings (e.g., a maximum miss count threshold or death threshold), a node is declared dead. Typically when only using a ping mechanism to detect a death, the miss count threshold is set high enough to ensure that a node is not prematurely declared as dead. So if the ping interval is every 2 seconds, it may take 2 seconds×15 ping misses or 30 seconds before a node is declared dead.

In method 300, a suspicion threshold is introduced and is set more aggressively than the miss count threshold, for example, 1-4 missed pings. Of course, other values may be used. In this example, the suspicion threshold is 2 ping misses and/or can be designated in terms of seconds (e.g., threshold set to a time that is less than a few seconds of non-responsiveness (less than 1-6 seconds)). This allows method 300 to more quickly but yet more reliably detect a dead node as compared to using only a ping mechanism as described below.

At 310, ping messages are periodically transmitted to a peer node. The miss count is tracked for each node and is initially set to 0. At 320, if a reply to the ping is received, then the miss count is reset to 0 at 330 and the ping process repeats for that node. If at 320 a reply is not received from a node, the miss count is incremented by 1 and the method checks whether the miss count has triggered the suspicion threshold at 340. If not, then the method returns to 310 where the ping process repeats for the node. If, at 340, the miss count triggers the suspicion threshold (e.g., 2 consecutive misses), then the node, is now suspected for possibly being dead.

To verify whether the suspected node is actually dead, at 350, a query is sent to the subnet manager that involves a port identifier of the suspected node. Similar to the query explained for block 240 in FIG. 2, the port identifier may be a serial number or other identifier of a port that is in the suspected node and the query includes a request to translate the identifier, in one embodiment.

If at 360 the translation is successful or otherwise the port is in the port table, the method returns to continue the ping process with the suspected node. At this point in the ping process, declaring the node dead is a false positive. In one embodiment, the miss count is not reset for the suspected node because if the maximum miss count threshold is met (e.g., 15 consecutive misses), the suspected node will be declared dead. When the maximum miss count threshold is met, the node is declared dead even though the queries to the subnet manager at block 360 have been successful. This scenario could be caused by a problem with the software stack that is responsible for returning ping replies (heartbeats).

Conversely, at 360, if the translation cannot be completed or fails for any reason, it means that the port identifier is not found in the port table of active ports that is maintained by the subnet manager. The subnet manager sends a failure notice back to querying node. At 370, when the querying node receives a failed query result, the suspected node is declared dead.

Although the failed translation or failure to find a port identifier in the port table is not by itself in isolation determinative of a dead node, this condition in combination with a number of missed ping messages creates a very high probability that the suspected node is actually dead. Thus by comparison, if only 2 missed pings are allowed (as set by the suspicion threshold) before the query is performed, the time for death detection is about: 2 ping misses×2 seconds/ping=4 seconds and 1 or fewer seconds for the query for a total time of less than 5 seconds. Recall that it took about 30-32 seconds for the typical ping protocol to declare a node dead with a 15 miss count threshold. Even if the suspicion threshold is set to 7 misses, the present technique would still be able to detect a node death in about half the time.

Once a node is deemed unreachable by the subnet manager and then declared dead, the group of servers/nodes on the network may release any locks held by the dead node and reconfigure the topology of the network as it would when a node is disconnected. In the case were the dead node is a storage cell being shared by database nodes, the database nodes respond by failing all pending I/O's to the dead cell and falling back to the mirror copy of the dead cell. In case of database node dying, it will result in the node being evicted from the cluster.

The disclosed techniques can be used to speed up death detection of database nodes or other nodes/cells in a network, which will in turn improve the cluster reconfiguration time. This is valuable to the group of servers/nodes because, the locks held by the dead node cannot be released (and made available to the healthy nodes) until the reconfiguration completes. In a database cluster, this means that the application tier will see the database tier to be frozen until the dead node is evicted.

Computer Embodiment

Figure 4:
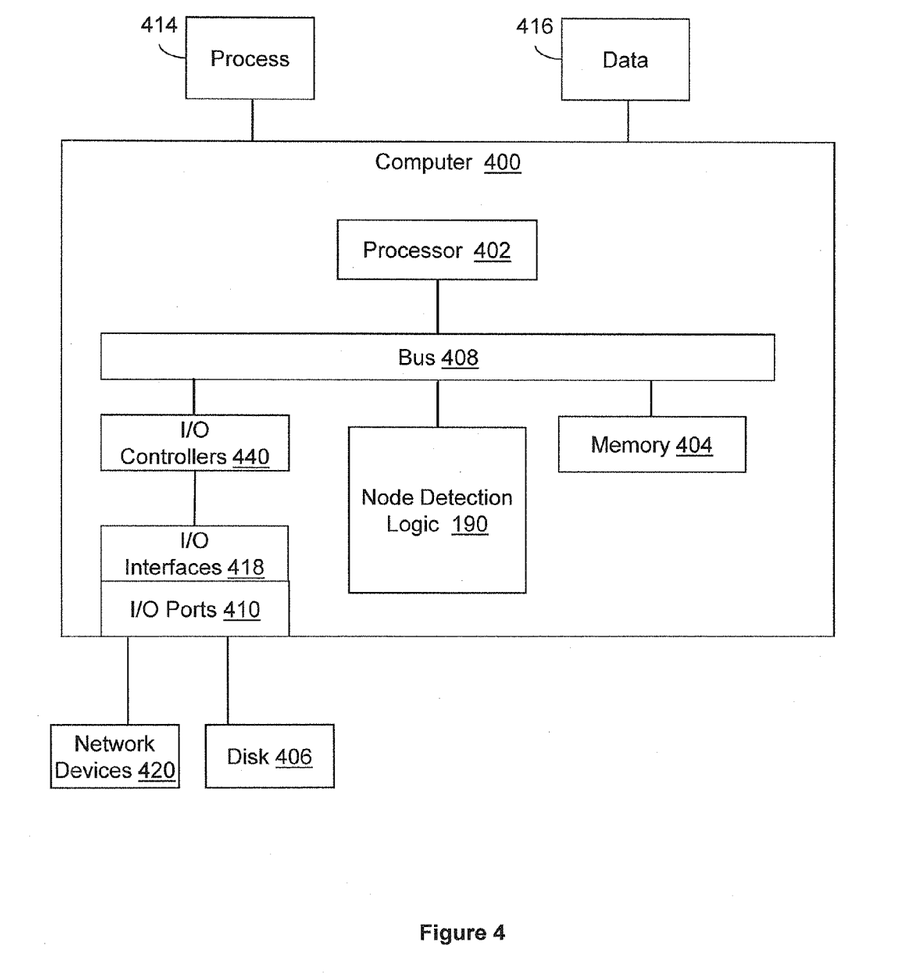
FIG. 4 illustrates an embodiment of a computing system in which example systems and methods, and equivalents, may be implemented in and operate.

FIG. 4 illustrates an example computing device in which example systems and methods described herein, and equivalents, may operate. The example computing device may be a computer 400 that includes a processor 402, a memory 404, and input/output ports 410 operably connected by a bus 408. In one example, the computer 400 may include or be programmed with the node detection logic 190 as described in FIG. 1. In one embodiment, the computer 400 is programmed to perform the methods of FIG. 2 and/or FIG. 3 as algorithms. In different examples, the logic 190 may be implemented in hardware, a non-transitory computer-readable medium with stored instructions, firmware, and/or combinations thereof. While the logic 190 is illustrated as a hardware component attached to the bus 408, it is to be appreciated that in one example, the logic 430 could be implemented in the processor 402.

Generally describing an example configuration of the computer 400, the processor 402 may be a variety of various processors including dual microprocessor and other multiprocessor architectures. A memory 404 may include volatile memory and/or non-volatile memory. Non-volatile memory may include, for example, ROM, PROM, and so on. Volatile memory may include, for example, RAM, SRAM, DRAM, and so on.

A disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The bus 408 may be a single internal bus interconnect architecture and/or other bus or mesh architectures. While a single bus is illustrated, it is to be appreciated that the computer 400 may communicate with various devices, logics, and peripherals using other busses (e.g., PCIE, 1394, USB, Ethernet). The bus 408 can be types including, for example, a memory bus, a memory controller, a peripheral bus, an external bus, a crossbar switch, and/or a local bus.

The computer 400 may interact with input/output devices via the i/o interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, USB ports, and/or HCA ports.

The computer 400 can operate in a network environment and thus may be connected to the network devices 420 via the I/O interfaces 418, and/or the I/O ports 410. Through the network devices 420, the computer 400 may interact with a network. Through the network, the computer 400 may be logically connected to remote computers. Networks with which the computer 400 may interact include, but are not limited to, a LAN, a WAN, a cluster, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, fewer blocks than the illustrated blocks may be used to implement an example methodology. Blocks may be combined or separated into multiple components. Furthermore, additional and/or alternative methodologies can employ additional blocks that are not illustrated.

DEFINITIONS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may—

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, solid state memories, magnetic disks, and so on. Volatile media may include, for example, semiconductor memories, dynamic memory, and so on. Common forms of a computer-readable medium may include, but are not limited to, a flexible disk, a hard disk, other magnetic medium, flash memory, an ASIC, a CD, other optical medium, a RAM, a ROM, a memory chip or card, a memory stick, and other media from which a computer, a processor or other electronic device can read.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system as described herein. Logic may include a microprocessor controlled by stored instructions, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer in a cluster of nodes cause the computer to perform functions, the computer-executable instructions comprising instructions configured for:
   transmitting ping messages to a peer node at periodic intervals;
   tracking a number of miss counts for the peer node, wherein a miss count is when the peer node does not send a reply to a ping message;
   when the miss count for the peer node triggers a suspicion threshold, querying a subnet manager of the cluster for a translation of a port identifier associated with the peer node; and
   determining that the peer node is dead when the translation from the subnet manager fails.

2. The non-transitory computer-readable medium of claim 1, wherein the subnet manager is implemented in a network switch and maintains a table of ports associated with the nodes in the cluster;
   wherein querying the subnet manager comprises instructions for sending a query to the subnet manager, wherein the query includes a request for a translation of a serial number associated with the peer node; and
   if the serial number does not translate to one of the port identifiers in the table, a failure notice is received from the subnet manager.

3. The non-transitory computer-readable medium of claim 1, wherein the cluster is implemented with point-to-point connections between switches and nodes in the cluster.

4. The non-transitory computer-readable medium of claim 1, further comprising instructions configured for releasing resource locks held by the peer node after the peer node is determined as dead.

5. The non-transitory computer-readable medium of claim 1, further comprising instructions configured for:
   in response to receiving a query result from the subnet manager that indicates the translation was successful, continuing with transmitting ping messages to the peer node; and
   if the number of miss counts triggers a maximum threshold and the translation from the subnet manager is successful, declaring the peer node as dead.

6. The non-transitory computer-readable medium of claim 1, further comprising instructions configured for tracking a miss count for each node in the cluster and sending a query to the subnet manager for when the miss count for a selected node triggers the suspicion threshold.

7. The non-transitory computer-readable medium of claim 1, further comprising instructions configured for setting the suspicion threshold to a number having a unit of seconds.

8. The non-transitory computer-readable medium of claim 1, wherein the instructions for querying the subnet manager of the cluster includes instructions configured for querying a table of port identifiers.

9. The non-transitory computer-readable medium of claim 1, further comprising instructions configured for receiving a failure notice from the subnet manager when the translation from the subnet manager fails to successfully perform.

10. A computing system, comprising:
   a plurality of nodes wherein each node includes at least one port for connecting to a network device;
   one or more switches that connect the plurality of nodes in a point-to-point network;
   a port table maintained in a switch of the one or more switches, wherein the port table includes a list of port identifiers assigned to each of the ports connected to the switch; and
   node detection logic configured to:
      transmit a ping message to a peer node in the point-to-point network;
      if a reply to the ping message is not received from the peer node, query the port table with a port identifier associated with the peer node;

declaring the peer node as dead when the query fails to successfully process; and periodically transmitting another ping message to the peer node when the query successfully processes.

11. The computing system of claim 10, further comprising input/output nodes connected to the one or more switches, wherein an input/output node includes a storage cell that is shared by the plurality of nodes.

12. The computing system of claim 10, further comprising a subnet manager implemented in the switch and configured to track ports connected to the switch, wherein the subnet manager is configured to:

assign a unique local identifier to a port when the port is connected to the switch;

store the unique local identifier of the port in the port table; and delete the unique local identifier of the port from the port table when the port is not visible to the subnet manager.

13. The computing system of claim 10, wherein the node detection logic is configured to generate the query to include a request for a translation of the port identifier to a corresponding unique local identifier assigned by the subnet manager.

14. The computing system of claim 10, wherein the node detection logic is configured to:

transmit periodic ping messages to the plurality of nodes;

set a suspicion threshold for a number of allowed missed ping messages;

tracking a miss count for each of the nodes, wherein a miss count is when a peer node does not send a reply to a number of consecutive ping messages; and querying the port table with a port identifier of a suspected node after the suspicion threshold is triggered by the miss count of the suspected node.

15. A non-transitory computer-readable medium storing computer-executable instructions that when executed by a computer in a cluster of nodes cause the computer to perform functions, the computer-executable instructions comprising instructions configured for:

transmitting a ping message to a peer node in the cluster;

if a reply to the ping message is not received from the peer node, querying a table of port identifiers that lists ports in the cluster, wherein the query includes a port identifier associated with the peer node;

declaring the peer node as dead when the query fails to locate a match in the table for the port identifier; and periodically transmitting another ping message to the peer node when the query locates a match in the table for the port identifier.

16. The non-transitory computer-readable medium of claim 15, wherein the instructions for querying the table of port identifiers comprises instructions configured for sending the query to a subnet manager that maintains the table, wherein the query includes a request for a translation of a serial number associated with the peer node;

wherein the translation includes translating the serial number to a port identifier in the table; and if the serial number does not translate to one of the port identifiers in the table, a failure notice is received from the subnet manager which is considered to indicate that the peer node is dead.

17. The non-transitory computer-readable medium of claim 15, further comprising the cluster being configured with an infiniband fabric.

18. The non-transitory computer-readable medium of claim 15, further comprising instructions configured for:

setting a suspicion threshold for a number of missed ping messages; and querying the table of port identifiers after the suspicion threshold is triggered by a number of missed ping messages by the peer node.

19. The non-transitory computer-readable medium of claim 15, wherein declaring the peer node as dead is based on when a combination of two conditions occur, which include:

a ping message is not replied to by the peer node; and the query to the table of port identifiers fails.

20. A computer-implemented method executed by a computer in a cluster of nodes, the method comprising:

transmitting ping messages by network communications to a peer node in the cluster at periodic intervals;

tracking, by at least a processor of the computer executing stored instructions from a memory, a number of miss counts for the peer node, wherein a miss count is when the peer node does not send a reply to a ping message;

when the miss count for the peer node triggers a suspicion threshold, executing stored instructions for querying a subnet manager of the cluster for a translation of a port identifier associated with the peer node; and determining, by the processor executing the stored instructions, that the peer node is dead when the translation from the subnet manager fails.

21. A computer-implemented method executed by a computer in a cluster of nodes, the method comprising:

transmitting, by at least a processor of the computer via a network interface, a ping message to a peer node in the cluster;

if a reply to the ping message is not received by the computer from the peer node, executing instructions by the processor for querying a table of port identifiers that lists ports in the cluster, wherein the query includes a port identifier associated with the peer node;

declaring, by at least the processor executing instructions, the peer node as dead when the query fails to locate a match in the table for the port identifier; and periodically transmitting, by at least the processor via the network interface, another ping message to the peer node when the query locates a match in the table for the port identifier.

* * * * *

UNITED STATES PATENT AND TRADEMARK OFFICE
CERTIFICATE OF CORRECTION

PATENT NO. : 9,135,097 B2
APPLICATION NO. : 13/431196
DATED : September 15, 2015
INVENTOR(S) : Sridharan et al.

It is certified that error appears in the above-identified patent and that said Letters Patent is hereby corrected as shown below:

On title page 2, column 2, item [56] under other publications, line 2, delete "2103," and insert -- 2013, --, therefor.

In the specification

Column 6, line 41, delete "node," and insert -- node --, therefor.

Column 6, line 61, delete "may-" and insert -- may. --, therefor.

Signed and Sealed this
Twenty-fourth Day of May, 2016

Michelle K. Lee
*Director of the United States Patent and Trademark Office*